US005657855A

United States Patent [19]

Ferguson

[11] Patent Number: 5,657,855

[45] Date of Patent: Aug. 19, 1997

[54] INDICIA APPLICATOR FOR CIGARETTE PACKAGES

[75] Inventor: Mark E. Ferguson, Batavia, Ill.

[73] Assignee: The Meyercord Co., Carol Stream, Ill.

[21] Appl. No.: 381,731

[22] Filed: Feb. 1, 1995

Related U.S. Application Data

[63] Continuation-in-part of Ser. No. 81,518, Jun. 23, 1993, abandoned.

[51] Int. Cl.$^{6}$ ..................................................... B65G 47/84

[52] U.S. Cl. .................................... 198/803.7; 198/470.1; 198/482.1

[58] Field of Search .............................. 198/470.1, 803.7, 198/482.1

[56] References Cited

U.S. PATENT DOCUMENTS

| | | | |
|---|---|---|---|
| 749,487 | 1/1904 | Kent . | |
| 1,109,541 | 9/1914 | Pease | 198/803.7 |
| 1,187,295 | 6/1916 | Fischer et al. . | |
| 1,188,747 | 6/1916 | Fischer . | |
| 1,234,722 | 7/1917 | Bracy . | |
| 1,558,800 | 10/1925 | Foster . | |
| 2,117,618 | 5/1938 | Malocsay . | |
| 2,166,381 | 7/1939 | Taylor et al. | 198/803.7 |
| 2,277,801 | 3/1942 | Talbot . | |
| 2,621,434 | 12/1952 | Jackson et al. . | |
| 2,982,075 | 5/1961 | Foster . | |
| 2,984,337 | 5/1961 | Couch et al. . | |
| 3,025,211 | 3/1962 | Winn . | |
| 3,067,863 | 12/1962 | Schwinger | 198/470.1 |
| 3,125,370 | 3/1964 | McGill | 198/803.7 |
| 3,451,874 | 6/1969 | Solomon et al. . | |
| 3,513,616 | 5/1970 | Davis . | |
| 3,540,570 | 11/1970 | Osterdahl et al. | 198/803.7 |
| 3,586,570 | 6/1971 | Solomon et al. . | |
| 3,659,694 | 5/1972 | Harris | 198/470.1 |
| 3,669,805 | 6/1972 | Engvoll . | |
| 3,750,676 | 8/1973 | Kruse et al. . | |
| 3,783,058 | 1/1974 | Solomon et al. . | |
| 3,997,384 | 12/1976 | Kuring et al. . | |
| 4,089,725 | 5/1978 | Crankshaw et al. . | |
| 4,101,362 | 7/1978 | Baker et al. . | |
| 4,184,305 | 1/1980 | Baker et al. . | |
| 4,253,560 | 3/1981 | Cross et al. | 198/803.7 |
| 4,263,766 | 4/1981 | Baker et al. . | |
| 4,414,056 | 11/1983 | Buchholz et al. . | |
| 4,500,241 | 2/1985 | Peters et al. . | |
| 4,664,740 | 5/1987 | Wilkinson . | |
| 4,711,687 | 12/1987 | Paules . | |
| 4,726,865 | 2/1988 | Treat . | |
| 4,762,587 | 8/1988 | Deal . | |
| 4,790,115 | 12/1988 | Focke | 198/803.7 |
| 4,944,830 | 7/1990 | Zodrow et al. . | |
| 4,950,350 | 8/1990 | Zodrow et al. . | |
| 4,996,826 | 3/1991 | Pfaffmann et al. . | |
| 5,009,741 | 4/1991 | Focke et al. . | |
| 5,056,536 | 10/1991 | Focke et al. . | |
| 5,061,334 | 10/1991 | Paules . | |

FOREIGN PATENT DOCUMENTS

| | | |
|---|---|---|
| 2526921 | 12/1976 | Germany . |
| 2702482 | 7/1978 | Germany . |
| 2752819 | 5/1979 | Germany . |

*Primary Examiner*—Joseph E. Valenza
*Attorney, Agent, or Firm*—Marshall, O'Toole, Gerstein, Murray & Borun

[57] ABSTRACT

This disclosure relates to an indicia applying machine comprising a wheel rotatably mounted on a frame, the wheel having a plurality of angularly spaced pockets which receive and hold cigarette cartons. Mounted on the frame around the wheel are a plurality of operating stations including a loading station for moving cartons into the pockets, an opening station for opening the flaps along one side of the cartons, one or more transfer stations for applying stamps, labels, tags, etc. to packages in the cartons, a closing station for applying an adhesive to the flaps of the cartons and reclosing the flaps, a holding or sealing station for holding the flaps closed while the adhesive sets, and an ejection station for removing the cartons from the pockets.

6 Claims, 11 Drawing Sheets

INDICIA APPLICATOR FOR CIGARETTE PACKAGES

RELATED APPLICATIONS

This application is a Continuation-In-Part of application Ser. No. 08/081,518 filed Jun. 23, 1993 now abandoned.

FIELD AND BACKGROUND OF THE INVENTION

This invention relates to machines for attaching indicia (such as tax stamps, labels, tax codes, etc.) to packages, and more particularly to such a machine for applying such indicia to cigarette packages.

Various taxing bodies in most jurisdictions require that tax stamps be attached to every cigarette package offered for sale, and it is normally the duty of the tobacco products distributors in each area to purchase the tax stamps and attach them to the cigarette packages. For example, federal, state and counties may require such tax stamps. In recent years, tags or labels have also been attached to packages or cartons for anti-theft purposes and for sales record maintenance.

Because of the sales volume of such products, it is not practical to attach the stamps by hand and numerous machines have been developed for automatically attaching tax stamps to cigarette packages. For example, the A. C. Davis U.S. Pat. No. 3,513,616 describes a machine of this nature. As shown in FIG. 12 of the Davis patent, a backing sheet or web having tax stamps attached to it is fed into the machine, and the stamps are automatically transferred by the machine from the backing sheet to the packages while the packages are in the cartons. The standard in the industry is a backing sheet containing fifteen lines of stamps evenly spaced across the width of the sheet, and the stamps are heat transfer decals. The stamps are transferred while the packages are in the cartons, and the Davis machine also includes mechanisms for automatically opening the cartons and later reclosing and sealing the cartons.

There are two major problems confronting the industry in the foregoing procedure. First, in recent years there has been a proliferation of sizes of packages and cartons, and there are even different arrangements of the packages in the cartons. In the past these differences have necessitated a number of adjustments to the machine by an operator when switching from one size to another. Such adjustments, in addition to being time consuming and requiring some degree of skill, add to the cost and complexity of the machine.

Secondly, the distributors are required to place the stamps on the packages, as mentioned above, and there are numerous large and small distributors. As a consequence, a suitable machine that is acceptable to the industry should not be overly expensive or complex in construction, and it should be able to handle the standard sheet of stamps.

The Philip A. Deal U.S. Pat. No. 4,762,587 describes what is purported to be a "universal" tax stamping machine capable of handling different package sizes, but adjustments are required when switching from one carton size to another. For example, different pocket forming inserts are required for different carton sizes. Further, the machine cannot be used with the standard sheet of tax stamps that has fifteen lines of stamps. Instead, it requires numerous separate strips or ribbons of stamps (one line of stamps in each ribbon) and spacer discs between the strips.

It is therefore a general object of the present invention to provide an automatic tax stamp applying machine which is capable of handling a variety of carton and package sizes without adjustment, which is relatively inexpensive, and which is not overly complex.

SUMMARY OF THE INVENTION

A machine constructed in accordance with the present invention comprises a wheel rotatably mounted on a frame, the wheel having a plurality of angularly spaced pockets which receive and hold cigarette cartons. Mounted on the frame around the wheel are a plurality of operating stations including an insertion station for moving cartons into the pockets, an opening station for opening the flaps along one side of the cartons, one or more transfer stations for applying stamps, labels, tags, etc. to packages in the cartons, a closing station for applying an adhesive to the flaps of the cartons and reclosing the flaps, a holding or sealing station for holding the flaps closed while the adhesive sets, and an ejection station for removing the cartons from the pockets.

The pockets include automatically activated clamps for centering and gripping cartons of different sizes.

Each transfer station includes a feed mechanism for moving a sheet of stamps past the wheel and a bar for pressing decals from the sheet onto the packages. This station also includes a shift mechanism for moving the feed mechanism and the sheet in the lateral direction relative to the bar and the packages.

The closing station includes a glue applicator for placing glue on at least one of the two flaps of the carton, and a folding mechanism for closing the two flaps.

The insertion station and the ejection station include mechanisms for automatically actuating the clamps of the pockets.

BRIEF DESCRIPTION OF THE DRAWINGS

This invention will be better understood from the following detailed description taken in conjunction with the accompanying figures of the drawings, wherein.

DETAILED DESCRIPTION OF THE INVENTION

Figure 1:
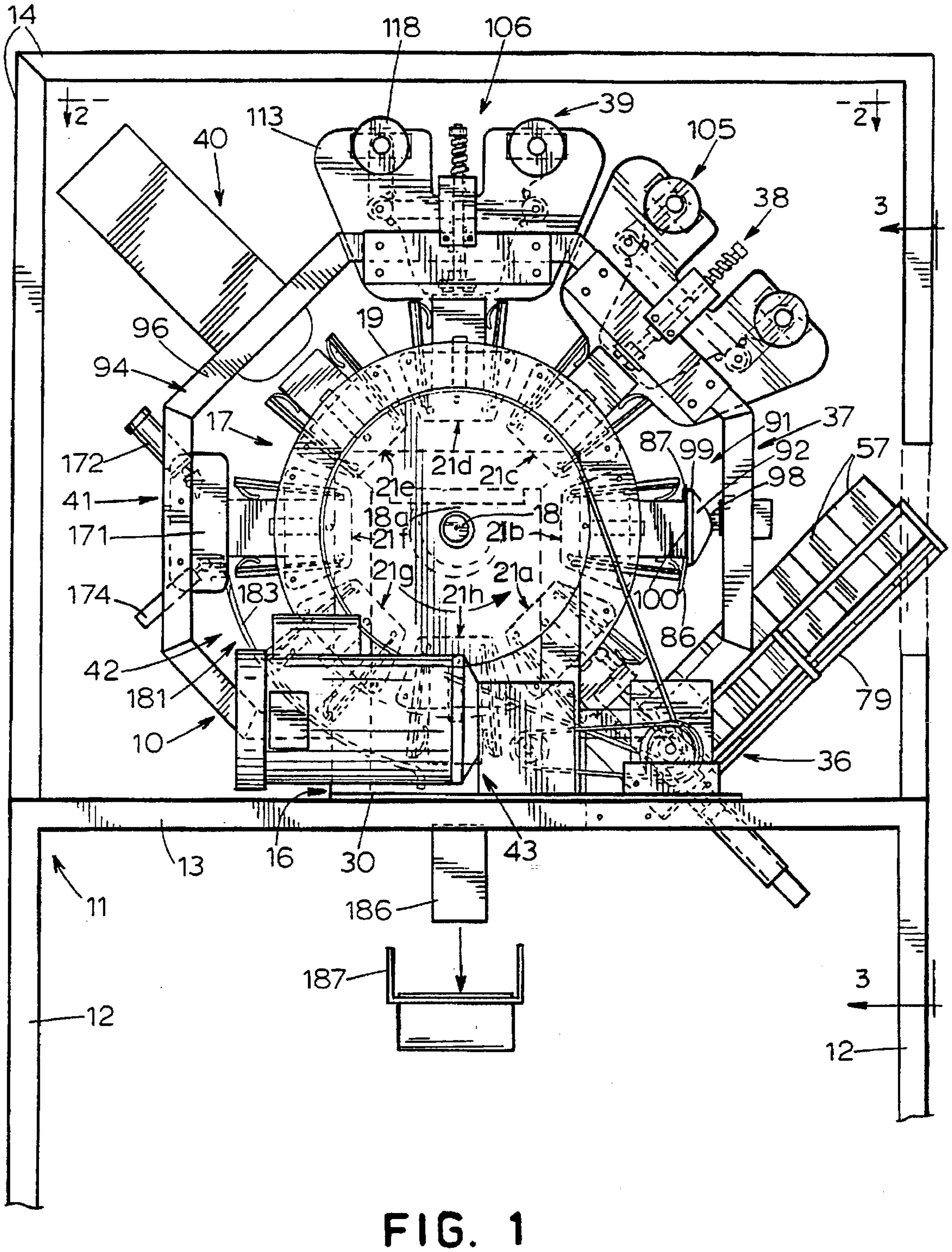
FIG. 1 is a side elevational view showing a machine constructed in accordance with the present invention.

With specific reference to FIG. 1, a machine 10 constructed in accordance with the present invention is, in the present specific example, mounted on a skeletal framework 11 which forms a support and guard for the machine 10. The framework 11 includes a plurality, such as four, of legs 12 which rest on the floor and are connected by horizontal braces 13, and the machine 10 is supported by the braces 13. The vertical height of the braces 13 above the floor is such that the machine 10 is at a comfortable working level for an operator of the machine. The framework 11 further includes vertical and horizontal members 14 which are spaced apart and extend upwardly from the braces 13 and extend across the sides and top of the machine 10 in order to protect it. The framework, however, allows easy access to the parts of the machine.

The machine 10 comprises a drum or wheel which is rotatably supported by the framework 10, the wheel carrying a number of carton receiving pockets, and a plurality of operating stations also supported by the framework 10, the stations being located around the periphery of the wheel. The arrangement for supporting the wheel and the stations on the framework 11 may take a variety of forms, and one such form is illustrated in the drawings and described as follows. Other supporting arrangements may instead be provided, and one such alternative supporting arrangement is briefly described hereinafter.

Figure 9:
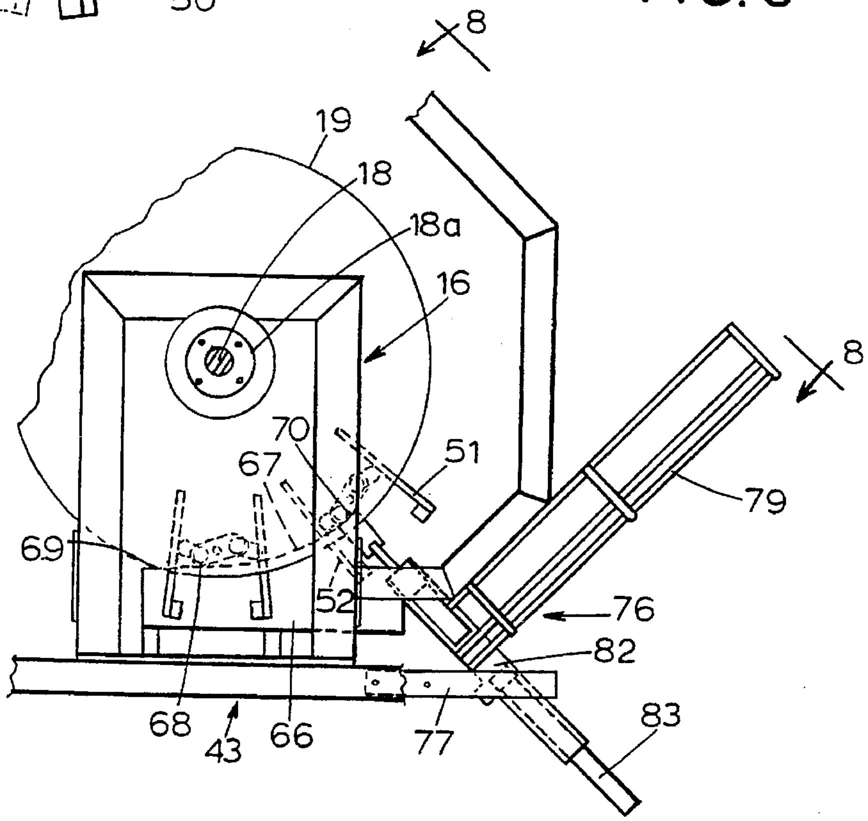

With reference to the arrangement illustrated in the drawings, the machine 10 is supported on the framework 11 by two inverted U-shaped supports 16 shown in dashed lines in FIG. 1 and in FIG. 9. The lower ends of the legs of the two supports 16 are secured to the horizontal braces 13 of the framework 11. The machine 10 includes a wheel or drum 17 having a central axle or shaft 18 which is rotatably mounted by bearings 18*a* on the supports 16. The wheel 17 is formed by two discs 19 and 20 (also see FIG. 3) which are coaxially mounted on the shaft 18 in laterally spaced relation. Mounted on the outer periphery of the wheel and extending between the two discs 19 and 20 are a plurality of cigarette carton receiving pockets or receptacles 21; in the present specific example, eight pockets 21A through 21H (FIG. 1) are provided.

The two discs 19 and 20 and the axle or shaft 18 are rotated in intermittent or stepwise fashion, and various drive system designs may be provided for this purpose. In one design, the drive system comprises a servo motor directly coupled to a planetary gear box which is attached to a chain coupling (to correct for a possible misalignment), the chain coupling being coupled to drive an end of the main shaft 18. The servo motor makes, for example, 24,000 steps to move the wheels the required 45° of rotation (from one station to another). The motor accelerates the wheels during the first 12,000 steps and decelerates during the last 12,000 steps; thus jarring is reduced to a minimum even though the movement from one station to the next requires only about 0.3 seconds overall.

Figure 2:
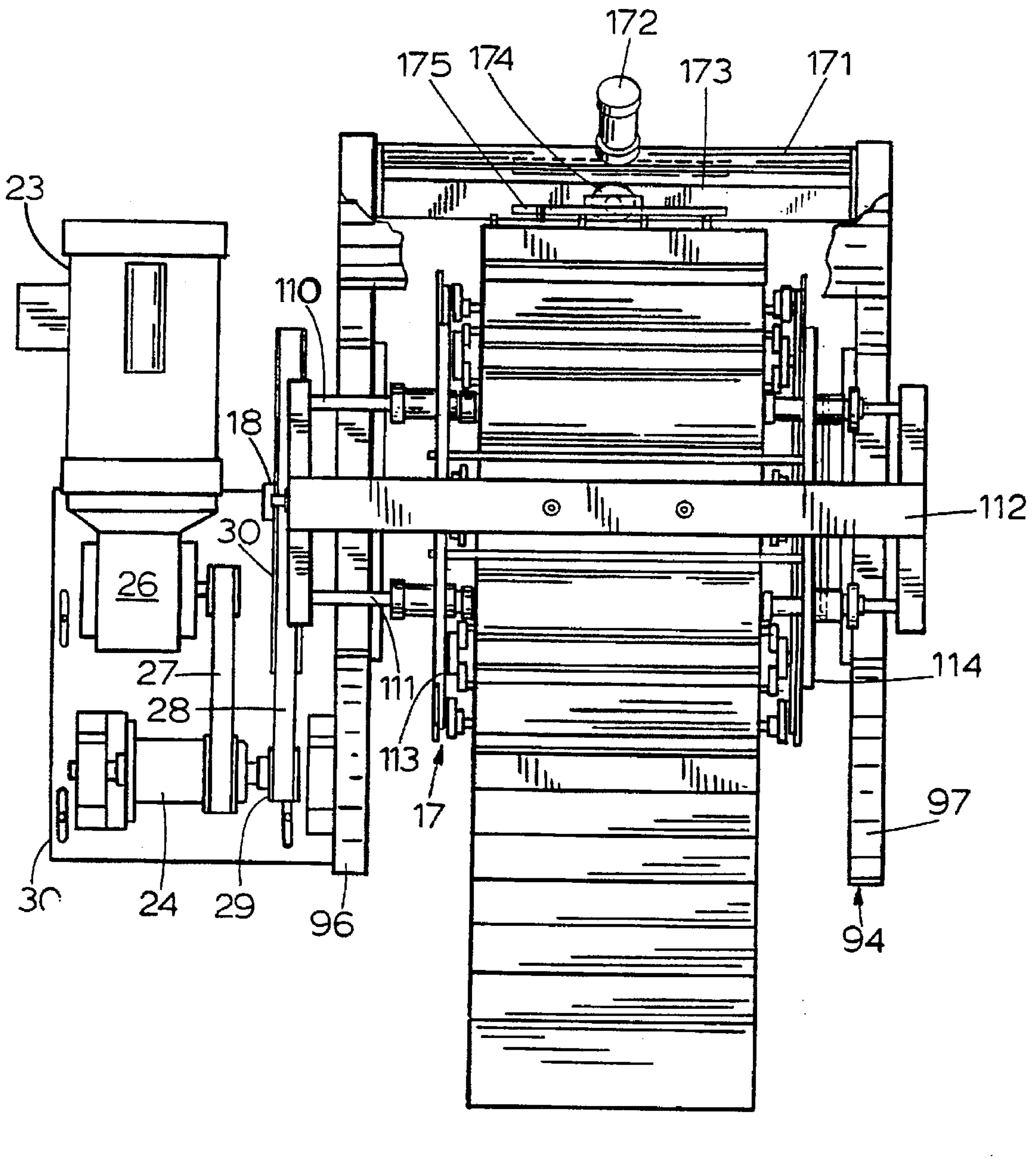
FIG. 2 is a top plan view taken on the line 2—2 of FIG. 1.
Figure 3:
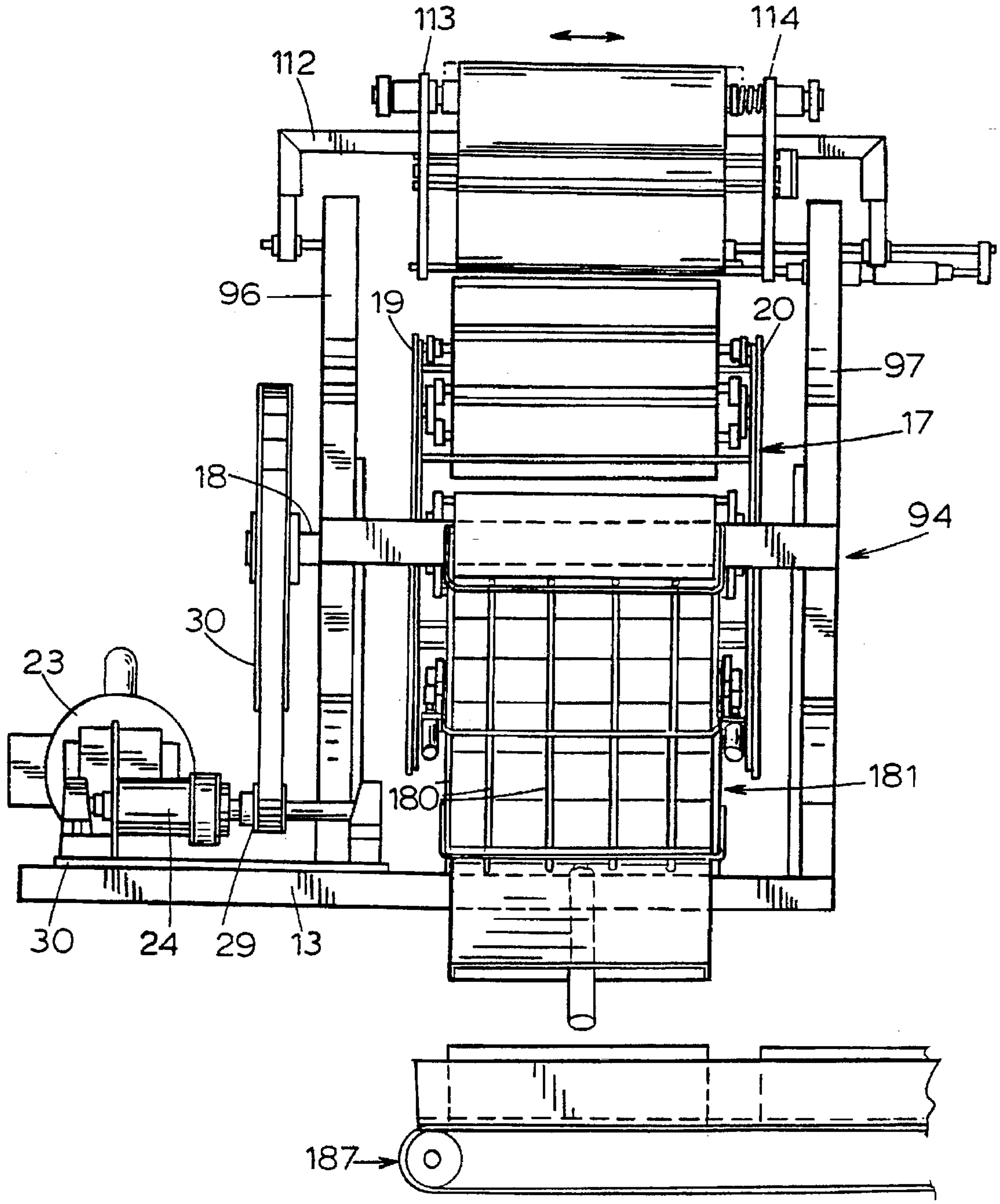
FIG. 3 is an end elevational view taken on the line 3—3 of FIG. 1.

While a system as described above is preferred, the drive system illustrated in FIGS. 2 and 3 comprises an electric motor 23 which is connected through a clutch 24 to drive the shaft 18. The power output shaft of the motor is connected to a speed reducer 26, and a drive belt 27 connects the output of the reducer 26 to the clutch 24. A second belt 28 connects a drive sprocket 29 to a driven sprocket 30, the latter sprocket 30 being mounted on the adjacent end of the axle 18. The two belts 27 and 28 are cogged timing belts. The motor 23 and the reducer 26 continuously drive the belt 27, but the clutch 24 engages and connects the drive to the belt 28 and the axle 18 only intermittently. As will be described in more detail hereinafter, the various operating mechanisms of the machine include sensors which detect the completion of the various operations and feed completion signals to a microcomputer. When the computer signals that all of the operations have been completed, the clutch 24 engages and the belt 28 turns the axle 18 and the two discs 19 and 20 through an angle of movement.

In the present specific example, there are eight stations around the circumference of the disc and the carton pockets stop at each of the stations. Since there are eight pockets and eight stations, the clutch 24 rotates the axle 18 through a 45° angle with each engagement. The motor 23 and the clutch 24 are mounted on a support plate 30 which, in turn, is mounted on the cross braces 13 of the exterior framework 11.

Mounted around the wheel 17 and separated by angles of 45° are eight working stations including a carton insertion station 36 (FIG. 1), a carton opening station 37, a first tax stamp applying station 38, a second tax stamp applying station 39, a station 40 for applying a tag, label, stamp, bar code, or other device, a carton closing station 41, a flap-holding or sealing station 42, and a carton ejection station 43. After each of the intermittent rotational movements of the wheel, the carton receiving pockets 21 stop opposite the eight stations 36 through 43 and various operations are performed while the wheel 17 is stationary. As previously mentioned, after the operations are completed, the wheel again rotates through an angle of 45° and the pockets stop adjacent the next adjacent station, the wheel rotating in the counterclockwise direction as seen in FIG. 1.

Figure 4:
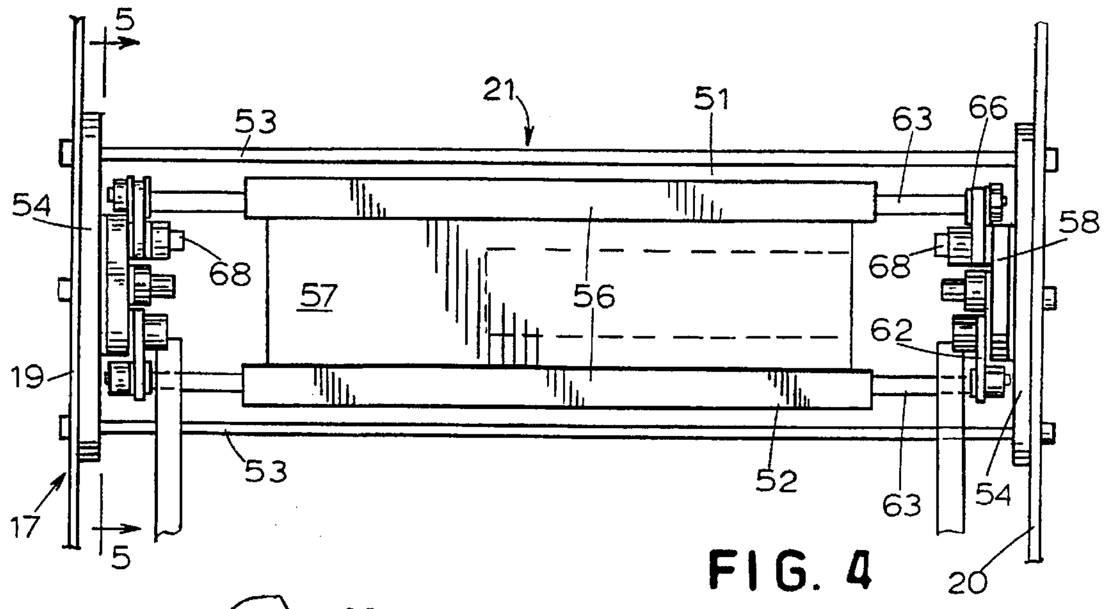
FIG. 4 is an elevational view of a carton-receiving pocket of the machine.
Figure 5:
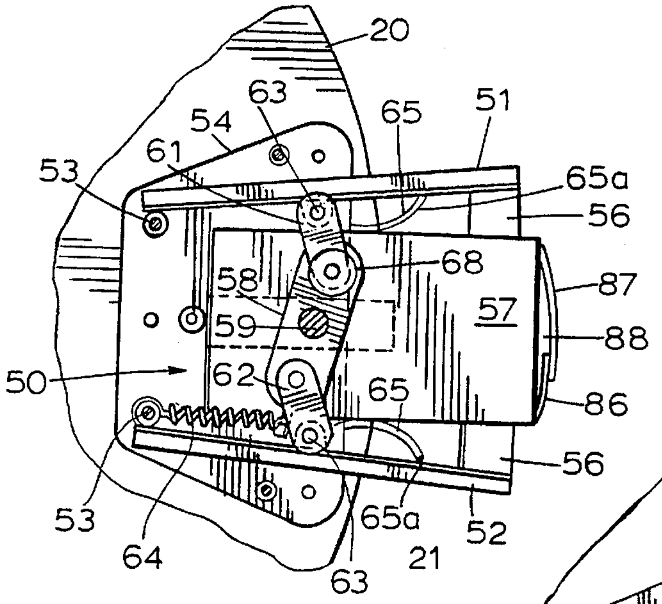
FIG. 5 is a view taken on the line 5—5 of FIG. 4 and showing a clamp mechanism.
Figure 6:
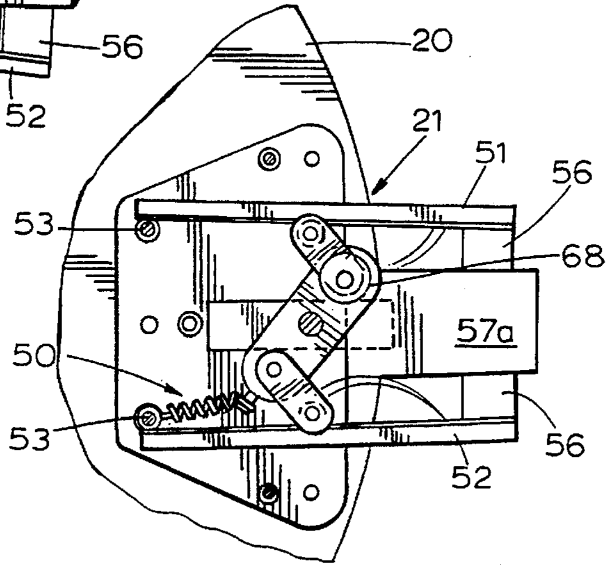
FIG. 6 is a view similar to FIG. 5 but showing different positions of some of the parts of the clamp mechanism.
Figure 7:
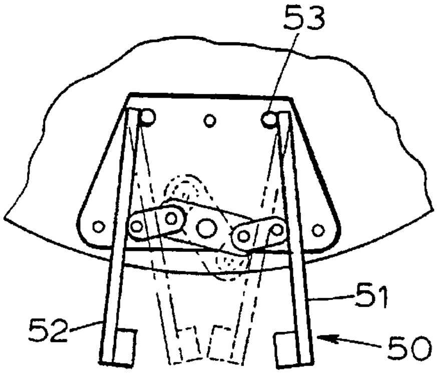
FIG. 7 is another view of the clamp mechanism.

Before describing the various operating stations 36 through 43, the carton-receiving pockets 21 of one embodiment of the invention are described in connection with FIGS. 4 through 9. Each pocket 21 includes a clamp mechanism 50 which releasably holds and centers a carton. The clamp mechanism 50 comprises upper (as seen in FIGS. 4 to 6) and lower clamp plates 51 and 52 which extend generally radially of the drum and are pivotably mounted at their radially inner edges by pivot rods 53. Supporting brackets 54 are secured to the interior sides of the two discs 19 and 20 and serve to support the rods 53 on the discs 19 and 20. Thus the radially outer ends of the clamp plates 51 and 52 are able to swing toward and away from each other as shown in FIG. 7. Clamp pads 56 (made, for example, of flexible urethane) are secured to the adjacent sides of the two plates 51 and 52 and, during operation, serve to frictionally grip and square a carton 57 between them. FIG. 5 Illustrates the clamping action when a larger size carton 57 is being processed, and FIG. 6 Illustrates the operation when a smaller size carton 57*a* is being processed.

As shown in FIGS. 5 and 6, the cartons have, on one long side thereof, a short flap 86 and a long flap 87 which are glued together, and the cartons are loaded into the machine such that the flaps are on the radially outer side of the carton. The pads 56 are located to squeeze the carton closely adjacent the radially outer side, causing the flaps 86 and 87 to bulge outwardly and create an inner gap or space 88.

The plates 51 and 52 are urged toward each other by two "scissors action" linkage mechanisms, one at each end of the pocket. Each of the mechanisms includes an elongated lever 58 pivotably mounted at its center by a pin 59 on the adjacent bracket 54 and the adjacent disc. The pin 59 is at the center of the lever 58, and two pivotable links 61 and 62 connect the ends of the lever 58 to the plates 51 and 52. Pivot pins 63 connect the links 61 and 62 to the plates 51 and 52. Further, a tension spring 64 connects the lower end of the lever 58 to the lower rod 53, thereby biasing the lever 58 in the clockwise direction as seen in FIGS. 5 and 6 and tending to move the clamp pads 56 toward each other to clamp the sides of a cigarette carton between them. Thus, the linkage consistently locates the carton along the longitudinal centerline of the pocket.

Preferably means are also provided in each pocket to support and assist in centering the carton between the upper and lower clamp plates 51 and 52. Leaf springs 65 have their radially outer ends 65*a* attached to the interior sides of the plates 51 and 52, the leaf springs bowing inwardly and radially inwardly. The inward ends of the springs 65 slide on the plates when the springs are flattened somewhat by the sides of a carton pressed into the pocket. The cartons, regardless of size, are also inserted at one end (such as the right end as seen in FIG. 4) of the pocket so that the packages are located relative to the stamp applicators to be described later. This may be accomplished by a mechanism or by the machine to operator who loads the cartons to the right side of the loading magazine 79 (to be described hereinafter). By locating the cartons at one end of the pockets, the side of the cartons at the other end of the pockets is accessible so that a tag or stamp, for example, may be attached to it.

The two clamp plates 51 and 52 must be spread apart before a carton may be loaded into a pocket. In the embodiment of the invention illustrated in FIGS. 1–12, this is accomplished by a mechanism including a cam track 66 (FIGS. 8, 9, 9A and 9B) which is provided adjacent each disc 19 and 20 at the stations 36 and 43. The two tracks 66 have cam surfaces 67 which extend in an arc from the ejection station 43 to the loading or insertion station 36. Each linkage mechanism includes a cam follower 68 (see FIGS. 5, 6, 9A and 9B) on a pin 63 connecting the lever 58 to a link 61, and the cam surfaces 67 press the followers 68 and the pins 63 radially inwardly at the ejection station 43 and as the followers move toward the loading station 36. This action pivots the lever 58 in the counterclockwise direction as seen in FIGS. 5 and 6 and thereby spreads the clamping plates 51 and 52 apart to an open clamp position. Since the cam surface 67 extends from the ejection station 43 to the loading station 36, the clamp of each pocket is open from the ejection station to the loading station. The leading end 69 of each cam surface 67 is sloped so that the followers 68 may ride up the slopes to the beginning of the cam surface at the ejection station. The trailing end 70 of each cam surface 67 terminates such that the followers 68 roll off the ends of the surfaces 67 and onto the ends 71A of two extended pneumatic cylinders 71 (see FIG. 9A). Thus the clamps are in the fully open position when at the ejection station and when initially at the loading station. Immediately after a carton is pushed into a pocket at the loading station, the rod of the cylinder 71 is retracted (see FIG. 9B), allowing the clamp to close and grip the carton.

Figure 8:
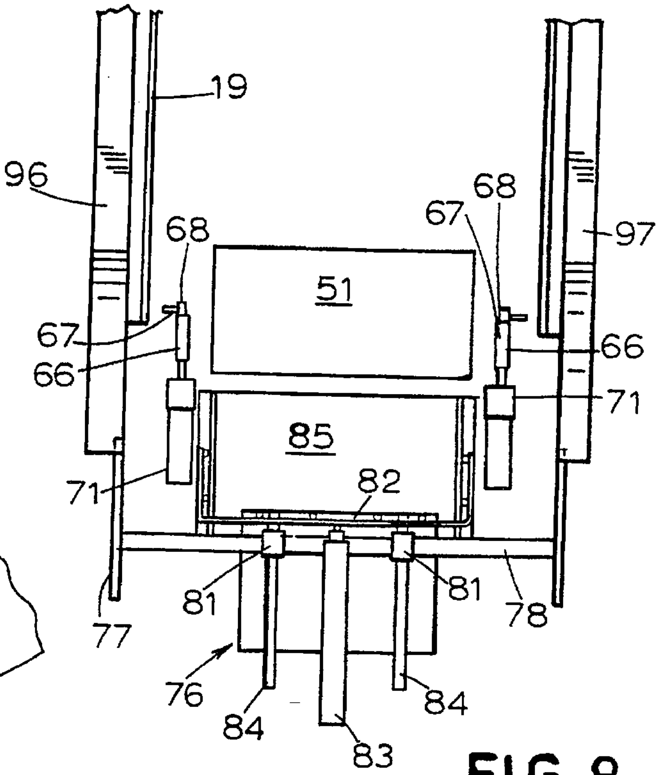
FIGS. 8, 9, 9A and 9B are views showing devices for actuating the clamp mechanism.
Figure 9A:
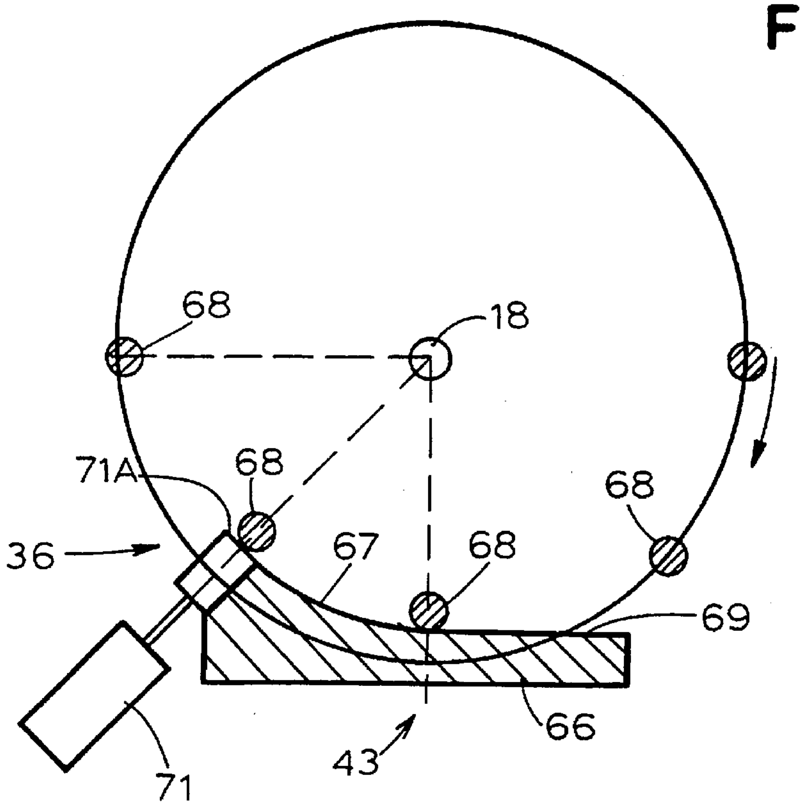
Figure 9B:
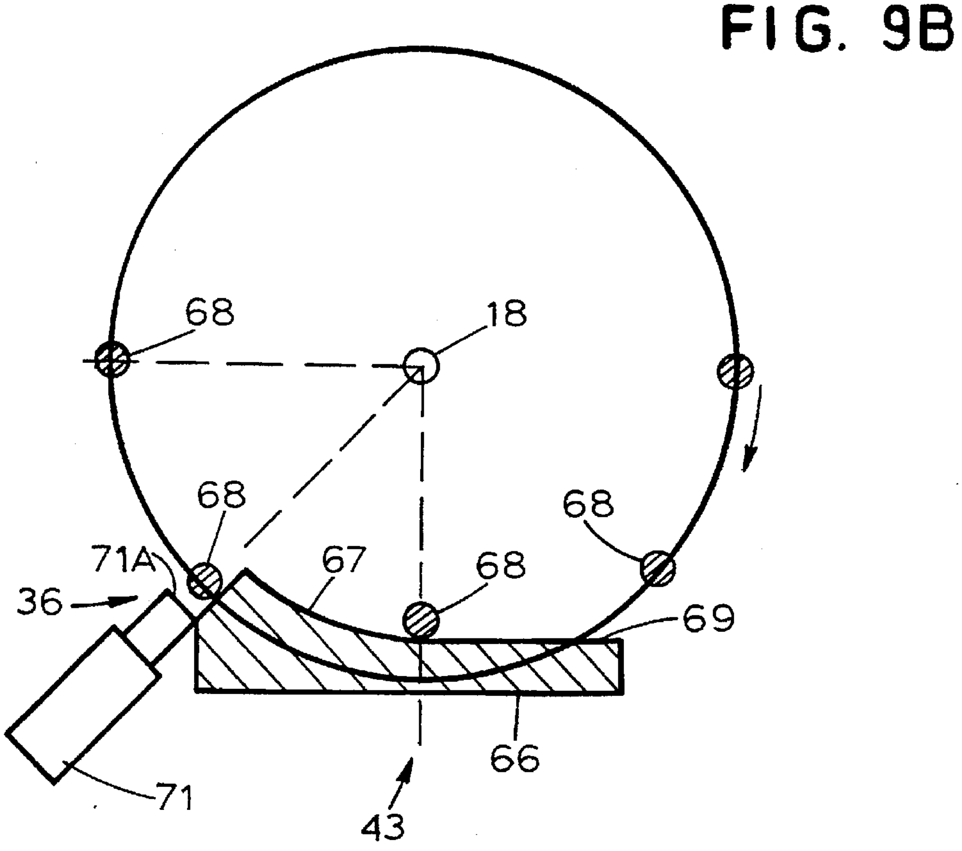

With reference to FIGS. 8 and 9, a carton loading mechanism 76 at the loading station 36 comprises two support arms 77 which have their lower ends secured to the cross braces 13 of the framework 11, and a cross member 78 that extends between the arms 77. Mounted on and extending upwardly from the member 78 is a carton magazine 79 into which the operator loads a stack of cartons 57 (see FIG. 1). A pusher is mounted at the lower end of the magazine and includes a pusher plate 82 which is moved radially toward or away from pocket at the station 36 by a pneumatic unit 83. The cylinder of the unit 83 is fastened to the member 78 and the piston rod is connected to the pusher plate 82, and two guide rods 84 slidably mounted on the member 78 by bearings 81 and attached to the plate 82 guide the reciprocating movement of the pusher plate 82 between extended and retracted positions. During the operation of the machine, an operator loads a stack of cartons in the magazine 79 at one side of the magazine, and the pusher plate 82 moves to the extended position and pushes the lowermost carton across a support tray 85 and into the open space between the opened clamp plates 51 and 52. The plate 82 always stops at the same position upon full extension. Since each carton is pushed at an upward angle, gravity tends to hold the carton against the pusher plate 82 and stop the carton with the radially outer side, regardless of size, at a radially fixed position. As will be described hereinafter in connection with FIGS. 13–15, a spring-biased bar or back plate is preferably provided in each pocket, which dampens overtravel during loading and assists in ejecting a carton at the ejection station. A support plate is attached to the pusher plate 82 which supports the cartons remaining in the magazine during the loading process. From FIG. 1 it will be noted that the loading station 36 is at a lower side of the wheel 17 and that the pusher plate pushes the carton at an upward angle, and gravity holds a carton against the pusher plate 82 until the clamp plates 51 and 52 close. The plate 82 remains in the extended position and supports the carton until the track cylinders 71 are retracted (just prior to rotation of the drums), allowing the clamp plates 51 and 52 to move together by the action of the springs 64 and clamp the carton in the pocket. The pusher plate 82 is then returned to the retracted position and the next carton drops in front of the pusher plate 82.

While not illustrated in the drawings, a mechanism may be provided for moving cartons to one side of the pockets, as previously mentioned. Such a mechanism may comprise a pneumatic cylinder mounted at one side of the support tray 85. The rod of the cylinder serves as a pusher to move the second from the bottommost carton to one side of the support tray and to hold that carton while the bottommost carton is being pushed into the pocket. Such a mechanism serves both to position the cartons to one side and to remove carton weight on the lowermost carton while it is being loaded.

At the station 37 is provided an opening mechanism 91 (FIG. 1) which breaks the adhesive connection between the flaps 86 and 87 and folds the flaps back to expose the ends of the cigarette packages in the carton. The mechanism 91 comprises an opening shoe 92 mounted on a track 93 that extends horizontally of and is supported by a frame 94. The frame 94 is formed by two frame sections 96 and 97 (see FIGS. 2 and 3) which are spaced axially and on opposite sides of the wheel 17, and they extend around the outside of the wheel as best shown in FIG. 1. The frame sections 96 and 97 are generally octagonal, there being one of the eight stations 36 to 43 at each of the eight sides, and the lower ends of the frame sections are secured to the two supports 16. The track 93 has its ends secured to and it extends between the two frame sections 96 and 97, and on its radially inner side is a horizontally movable slide member 98 which supports the shoe 92. The track 93 and the slide member 98 form a rodless pneumatic device wherein the slide member and the shoe are moved by pneumatic force from one end of the track 93 to the other, when actuated.

The shoe 92 includes a small sized nose portion at its forward end which moves into the gap or space 88 under the two flaps. From the small nose end, the shoe widens in the vertical direction as seen in FIG. 1 (the flaps 87 and 88 also initially extend generally vertically when at the opening station 37) and forms wings 99 (FIG. 1) which overlie the entire side of the carton, the radially inner side 100 of the shoe being flat. Thus, as the shoe 92 is moved from its starting position, the nose moves into the space 88; the shoe 92 enlarges both vertically and radially, and causes the adhesive connection between the flaps to break. The flat bottom side 100 of the shoe presses the flaps outwardly as shown in FIG. 1 and the flat bottom side of the shoe creases the hinge connection of the flaps. A simple arcuate shield or guide at the outer side of the wheel and the cartons in the pockets and extending from the opening station 37 and past the indicia applying stations 38, 39 and 40, may be provided to hold the flaps open as the cartons are moved from the opening station 37 and past the applying stations 38, 39 and 40.

As previously mentioned, other arrangements may be provided for supporting the wheel and the stations on the framework 11. The two inverted U-shaped supports 16 and the two octagonal frame sections 96 and 97 may be replaced by two vertical, parallel plates, each having an outer dimension corresponding generally to that of the frame sections 96 and 97. In this arrangement, the framework 11 includes additional (preferably horizontal) cross braces secured to the members 13 and 14, and the above-mentioned two plates are secured to the braces 13 and the additional cross braces at approximately the locations of the frame sections 96 and 97. The shaft 18 and the stations would be supported by the two plates in this arrangement.

Mounted on the frame 94 (or on the two plates in the alternate support mentioned above) at the stations 38 and 39 are first and second tax stamp applying mechanisms 105 and 106 (FIG. 1). One of the mechanisms may apply, for example, a federal tax stamp and the other may apply a state or county tax stamp. The two mechanisms 105 and 106 are identical and therefore only the second mechanism 106 is described in detail and illustrated in FIGS. 1 to 3, 10 and 11.

Figure 10:
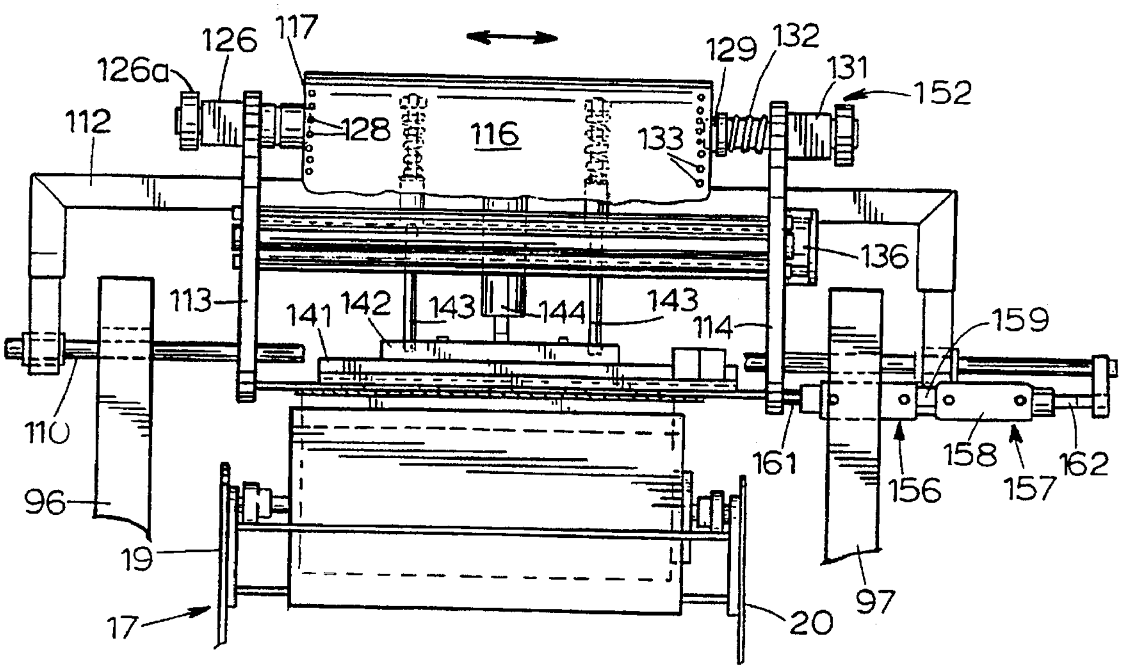
FIG. 10 is an elevational view showing a transfer mechanism of the machine.

The mechanism 106 comprises two parallel shafts 110 and 111 (FIGS. 2, 10 and 11) which extend parallel to the axle 18 of the wheel 17 and are secured to the two sections 96 and 97 of the machine frame 94. As shown in FIG. 8, the shafts 110 and 111 are spaced apart in the horizontal direction, and a support bar 112 having an inverted U shape is supported by the shafts 110 and 111 adjacent the outer ends of the two shafts. The bar 112 extends upwardly from the shafts 110 and over the tops of the two sections of the frame. Two mounting plates 113 and 114 are slidably mounted on the two shafts 110 and 111 for movement parallel to the axis of the wheel axle 18, the plates 113 and 114 having a generally trapezoidal shape and extending upwardly from the shafts 110 and 111. The two plates 113 and 114 are spaced apart and are on opposite sides of the pockets on the wheel 17. The plates 113 and 114 are secured together by connecting and form a movable carriage 152 which is slidable in the right-left direction as seen in FIG. 10.

Figure 11:
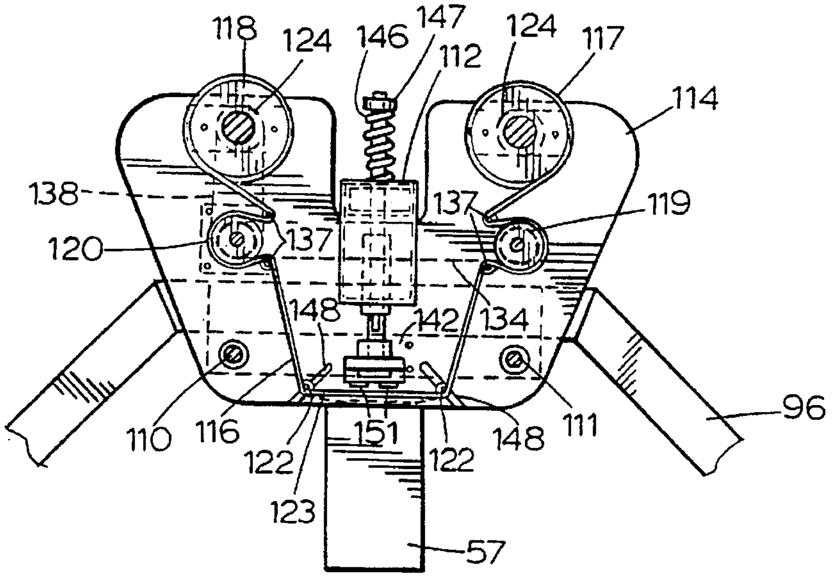
FIG. 11 is a sectional view taken on the line 8—8 of FIG. 7.

Mounted between the two plates 113 and 114 is a transport or feed mechanism for a backing sheet or stamp web 116, best shown in FIG. 11, which moves from a supply roll 117 to a takeup or rewind roll 118. From the supply roll 117, the sheet 116 loops around two drive rolls 119 and 120 and two tensioning rods 122. The bottommost part 123 of the sheet extends horizontally and closely above a carton 57 containing cigarette packages to be stamped.

The supply and takeup rolls 117 and 118 are formed by tubular cylinders 124 having the sheet 116 rolled thereon. The two cylinders 124 are similarly supported for rotation between the two plates 113 and 114 by a rotary support 126 on the plate 113 and two fixed guide rods 127 on the plate 114, the supports 126 and 127 for each roll being axially aligned. The support 126 has a freely rotatable nose 128 which extends into an end of the cardboard cylinder 124 which forms the core of the stamp supply and takeup rolls, and the support 127 similarly includes a rotatable nose 129 which extends into the other end of the cylinder 124. The nose 129 of the support 127 is connected to a handle 131 such that the nose 129 may be manually pulled away from the core 124 to allow replacement of a supply or takeup roll, and a compression spring 132 normally urges the nose 129 into the cylinder. The other support 126 includes a rotatable screw knob 126*a* which enables an operator to move the nose 128 to the right or left a short distance against the force of the spring 132, so that the location of the backing sheet 116 may be adjusted relative to the packages in the carton 57.

The sheet 116 has holes or perforations 133 along both edges (see FIG. 10), and the two drive rolls 119 and 120 have radial pins which extend into the holes 133 to provide a positive drive for the sheet 116. The two drive rolls 119 and 120 are connected for synchronous rotation by a timing belt 134 (FIG. 11), and a drive motor 136 (FIG. 10) periodically turns the two drive rolls 119 and 120. Idler rollers 137 adjacent the two drive rolls 119 and 120 ensure that the sheet 116 extends through a substantial arc around each of the drive rollers. A belt 138 (FIG. 11), such as a garter spring or an O-ring, extends between the drive roll 120 and the take-up roll 118 and turns the roll 118 to prevent slack in the backing sheet 116. Instead of a garter spring or an O-ring, the drive for the take-up roll 118 may comprise a timing belt coupled to turn with the drive roll 120 and an adjustable variable slip clutch on the roll 118.

Mounted on the support 112 between the two rolls 117 and 118 and above the bottom portion 123 of the sheet is a presser iron 141 which, during operation, is heated by an electrical heater coil. The iron 141 is secured to the underside of a support bar 142 which, in turn, is supported by two guide rods 143 and a pneumatic cylinder 144. The cylinder 144 is secured to the cross brace 112 and its piston rod is attached to the support bar 142. The guide rods 143 extend vertically downwardly from and are supported by bearings on the brace 112. The guide rods 143 extend through the bearings and are biased upwardly by compression springs 146 positioned between the brace 112 and nuts 147 on the upper ends of the rods 143.

When the cylinder 144 is actuated, the air pressure forces the hot presser iron 141 downwardly against the inside (or the back) portion 123 of the sheet 116, and presses the stamps with considerable force against the packages. At the termination of actuation, the springs 146 return the iron 141 to the upward position shown in FIG. 11.

Instead of the cylinder 144 and springs 146 arrangement as described above, one or more double-acting pneumatic cylinders may be connected between the frame and the support bar 142, thereby avoiding the need for the springs 146.

On the underside of the iron 141 are formed two rows of raised projections or heated platens 151, five projections in each row, which are similar in construction to the members 240 shown in the A.C. Davis U.S. Pat. No. 3,513,616. The distance in the left-right direction as seen in FIG. 11 between the two rows is equal to the separation between two laterally extending rows of stamps on the sheet 116, and the distance in the left-right direction as seen in FIG. 10 between adjacent projections is equal to the distance between three stamps in the row (see the discussion relative to FIG. 12 of the above Davis patent, the disclosure of which is incorporated herein by reference). The spacing between the two rows of projections 151 is also the distance between two rows of cigarette packages in the carton 57. When the iron 141 is moved downwardly, it bows the portion 123 of the sheet 116 downwardly and simultaneously presses ten stamps on the ten packages in the carton. Since the drive rolls 119 and 120 are held stationary while the sheet portion 123 is pressed down, the two idler rollers 122 are allowed to move upwardly to provide enough slack in the sheet 116 to allow for the bowing of the sheet. The idler rollers 122 are mounted in angled slots 148 formed in the two supports 113 and 114, and springs (not shown) between the rollers 122 and the supports 113, 114 urge the rollers 122 downwardly toward the lower ends of the slots. When the iron 141 moves downwardly and bows the sheet 116, the idler rollers 122 are pulled upwardly slightly to allow for the bow, thus preventing shifting of the two rows of stamps under the projections 151 in the direction of the length of the sheet 116. The idler rollers also function to ensure that the stamp backing paper snaps upwardly away from the packages after the stamps have been applied and the stamp iron has retracted upwardly, thereby ensuring that the backing paper does not adhere to the surfaces of the packages and tear when the drum rotates.

As previously mentioned, the two support plates 113 and 114 form the carriage 152 for the above described rollers mounted between them and for the sheet 116, and the carriage 152 is shifted in the left-right direction as seen in FIG. 10 during operation. The pressing iron 141 and the brace 112, however, do not move in the left-right direction, although the iron 141 reciprocates up and down as previously described. The carriage 152 shifts between left, center and right positions to move the sheet 116 and place different sets of stamps on the sheet portion 123 underneath the projections 151 on the iron. As described in the above-mentioned A.C. Davis patent, a standard sheet of tax stamps has laterally extending rows of stamps, fifteen stamps to the row. For the purpose of the present description, the thirty stamps in two adjacent rows of stamps are divided into three sets of ten stamps each. The first set comprises the first, fourth, seventh, tenth and thirteenth stamps of the two rows; the second set comprises the second, fifth, eighth, eleventh and fourteenth stamps of the two rows; and the third set comprises the third, sixth, ninth, twelfth and fifteenth stamps. When the carriage is in the left position, the ten projections 151 are above the ten stamps of the first set, and downward movement of the hot iron 141 (due to actuation of the cylinder 144) presses the first set of stamps onto the ten packages in a carton. When the next carton is in place under the iron, the carriage is shifted to the center position and the iron presses the ten stamps of the second set onto the packages. Similarly when the next carton is under the iron, the carriage is shifted to the right position and the ten stamps of the third set are pressed onto the packages. At this time all thirty of the stamps of the two rows are transferred to the packages, and the drive rollers 119 and 120 are then turned to advance the sheet 116 by the distance of two rows to place the stamps of the next pair of rows under the iron 141. The foregoing procedure is then repeated to place stamps on the packages of the next three cartons.

To move the carriage 152 between the left, center and right positions, two pneumatic units 156 and 157 (FIG. 10) are provided. The cylinders 158 of the two units 156 and 157 are secured together by a bracket 159; the piston rod 161 of the unit 156 is attached to the plate 114 of the carriage; and the piston rod 162 of the unit 157 is attached to the stationary rod 110 which, in turn, is secured to the frame of the machine. In the position shown in FIG. 10, the piston rod 161 is retracted into its cylinder 158 and the rod 162 is extended, and the carriage 152 is in the center position. When both rods 161 and 162 are extended, the carriage 152 is in the left position, and when both rods 161 and 162 are retracted, the carriage 152 is in the right piston. Thus, by selective actuation of the two units 156 and 157, the carriage and the sheet of stamps is movable between the three positions relative to the wheel and the cartons in the pockets. Preferably the sequence of actuation of the two units 156 and 157 is reversed after each group of three cartons is stamped, so that the carriage does not have to return full stroke to a single starting position at the beginning of stamping of each group of three cartons.

The applicator mechanism 106 places stamps at essentially the same position on all of the packages. It is preferable that any additional applicator mechanism 105 be offset relative to the first mechanism 106 (as by physically mounting the mechanism at an offset location) so that the stamps applied by the two mechanisms 105 and 106 are side-by-side on the packages.

The third applicator unit 166 at the station 40 may be a conventional tag or label applicator for attaching tags or labels to the packages or to the flaps of the cartons, or the unit 166 may be another tax stamp applicator constructed similarly to the units 105 and 106.

After the stamps/tags/labels have been attached to the cigarette packages as described, each carton 57 (FIG. 12A) in turn is moved to the station 41 where the flaps are turned in and an adhesive is applied to the outside surface of the small flap 86. The flap turning mechanism comprises a support bracket 171 (FIGS. 1 and 2) which extends laterally between the two octagonal frame sections 94 and 96. A pneumatic cylinder 172 (also see FIGS. 12B to 12E) is mounted on the bracket 171, and when actuated after the wheel moves a carton to the station 41, it moves a rod 173 downwardly and radially inwardly to fold the short flap 86 inwardly. The rod 173 also carries a glue applicator 173A which applies a quick setting adhesive 173B to the outside surface of the short flap 86. Also mounted on the bracket 171 below the cylinder 172 is a second pneumatic cylinder 174 which, when actuated, moves a second rod 175 upwardly to fold the long flap 87 upwardly and inwardly over the glue 173B on the short flap 86.

The glue applicator 173A may comprise, for example, a "cold glue" carton placed upright inside a pressurized tank. The low pressure (about 10 psi) forces the adhesive up a tube to a valve actuated by the controller of the machine. On demand, the valve allows adhesive to flow into a manifold where it is distributed by a number (such as four) small hoses to an equal number of disposable applicating needles attached to the applicating head, which extends through the length of the carton-receiving pocket. This arrangement provides consistent applications of glue without runs or drips, and very precise, repeatable placement of the glue. In addition, the operator simply throws an empty glue carton away when it is empty, and no cleaning of the pressure tank is required.

Figure 12A:
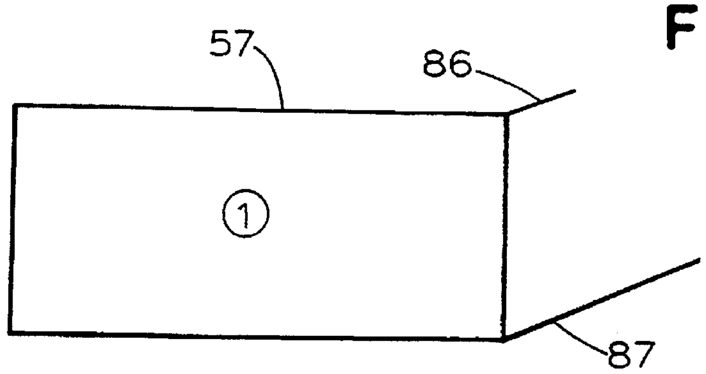
FIGS. 12A to 12E are views illustrating the construction and operation of the glue applicator and the flap folding mechanisms.
Figure 12B:
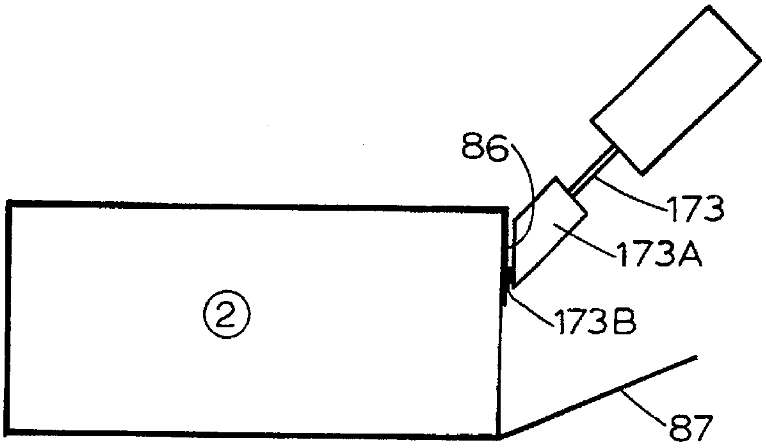
Figure 12C:
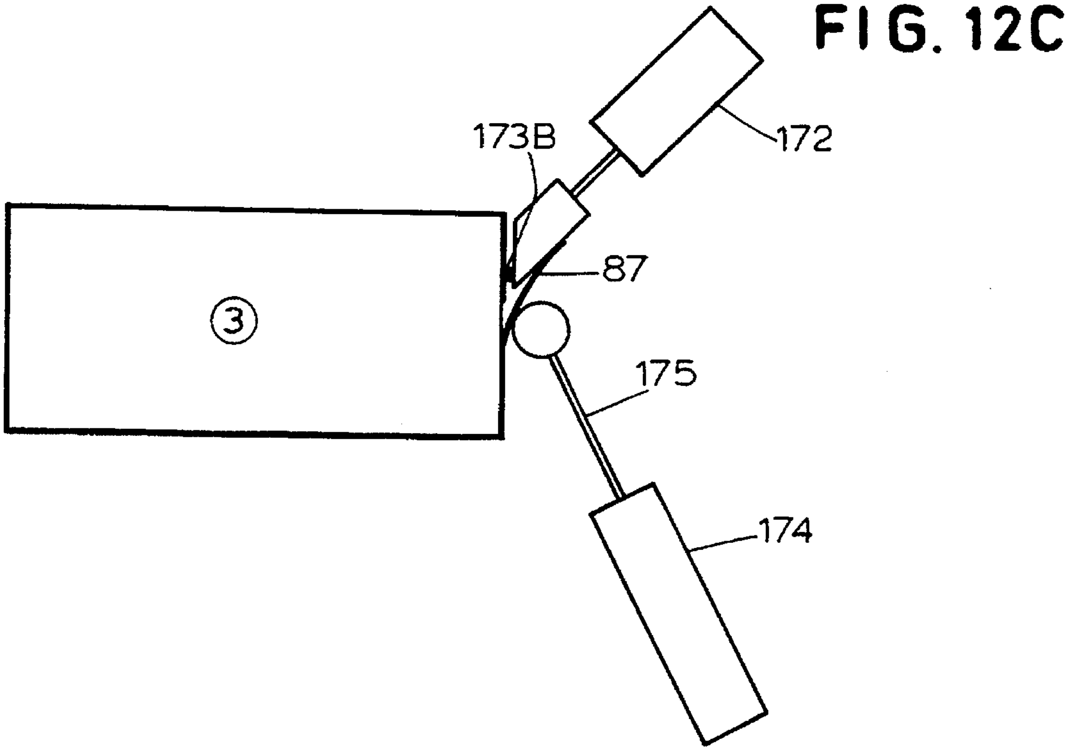
Figure 12D:
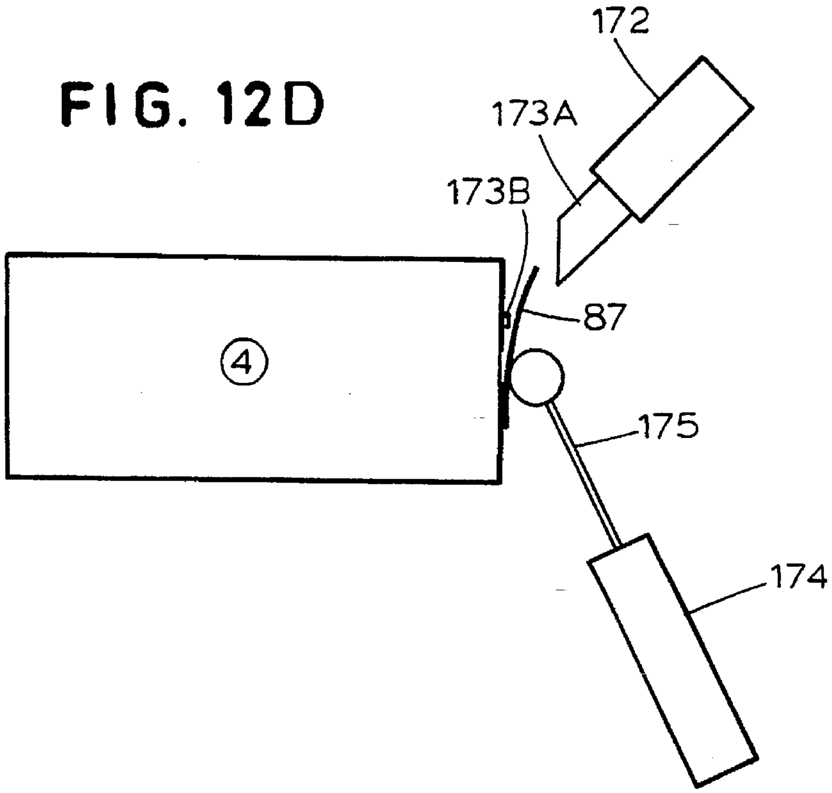
Figure 12E:
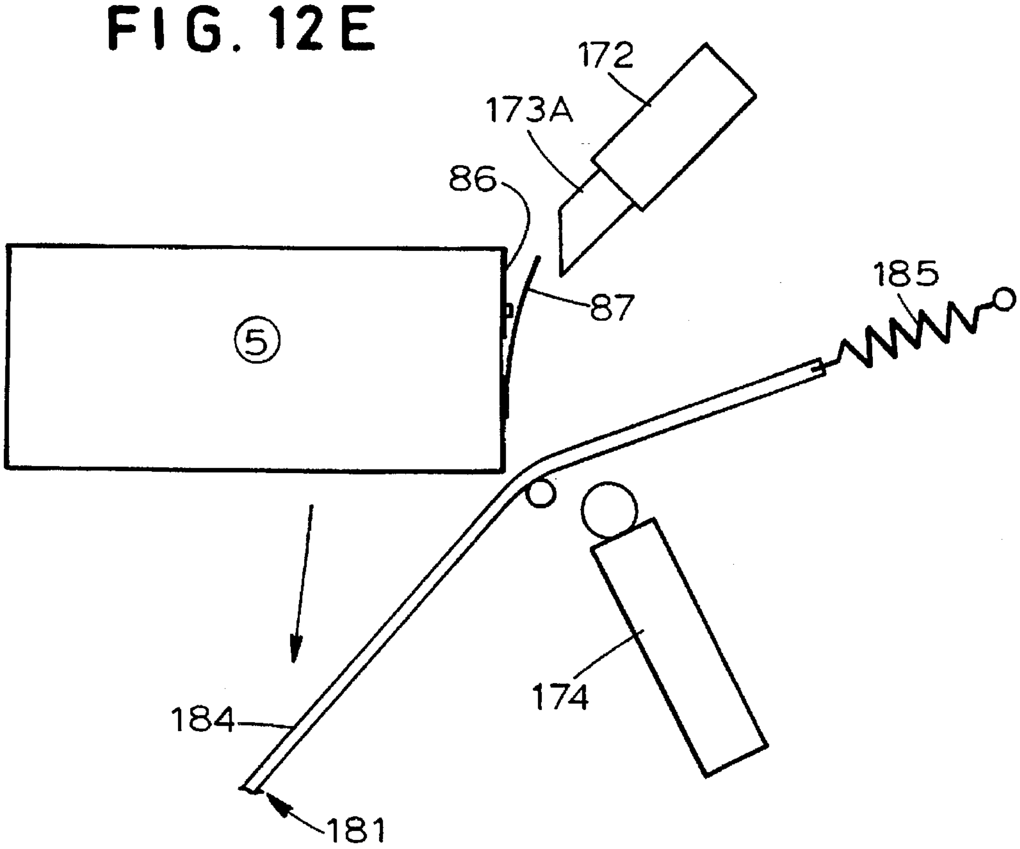

Below the rod 175 is a folding guide 181 mounted on the frame sections 94 and 96, which holds the flaps in the folded position as the carton moves to the ejection station. Various devices may be provided for this purpose, and preferably a plurality of spaced nylon straps may be strung between the glue applicator and the ejection station as shown in FIG. 12E. FIGS. 1 to 11 illustrate an alternate arrangement comprising a plurality of arcuate rods 180, as shown in FIG. 3, which are spaced along the length of the pocket and the carton at the station 41 as shown in FIG. 3. The upper ends 182 of the rods 180 are preferably curved outwardly and extend just below the long flap of the carton at the station 41 and it turns up the long flap slightly. Below the upper end 182, the main portions 183 of the rods extend in an arc toward the ejection station and the rods 180 terminate just before the ejection station 43. The arcuate main portions 183 are located to engage and press the outer side of each carton inwardly as it is moved from the closing station through the holding station 42, and to the ejection station 43.

Instead of arcuate rods, a set of the previously mentioned abrasion resistant, flexible strips 184 (FIG. 12E), loaded by tension springs 185 may be provided.

During operation, as a pocket with a carton therein moves to the folding station 41, the pneumatic unit 177 is in the retracted position and the two flaps of the carton move past the rod 173 and the glue nozzles. Once the carton stops at the station 41, the piston rod 173 of the unit 172 is extended (FIG. 12B), causing the rod 173 and the glue applicator to move downwardly. The rod 173 presses the short flap downwardly and the glue nozzles spread a small amount of quick setting glue 173B on the outside of the small flap 86. The rod 175 moves the long flap 87 upwardly to the position where the long flap is just outside the outer edge of the short flap. When the rod 173 carrying the glue applicator is retracted (FIG. 12D), the rod 175 folds the long flap 87 against the glue 173B. Thereafter, the rod 175 is retracted, and when the carton is subsequently moved counterclockwise (as seen in FIG. 1), the folding guide 181 presses the long flap inwardly over and against the short flap, and the two flaps are moved to the closed position. The glue spreads out on the adjacent surfaces of the two flaps and starts to set. To obtain a better connection between the flaps, additional pressure fingers may also be provided between the rods 180 to engage the outer flap 87 and hold the two flaps tightly together. When the carton reaches the ejection station 43, the clamp in the pocket is released as the cam plates engage the followers 68 and the carton falls downwardly. As will be described hereinafter, a pressure bar is preferably provided to pop the carton out of the pocket. FIG. 1 shows a carton 186 falling down to a conveyor 187 (also see FIG. 3) which moves the cartons to a repacking area (not shown) where the cartons are repacked in the original cases. For small runs of cartons, a basket may be placed under the ejection station 43.

The machine also includes a controller which may have a conventional construction and therefore is not illustrated or described in detail. The following is a description of the machine and the controller through a complete cycle of operations on cartons at the operating stations. Assume that the wheel has just completed a step or movement of 45°, the carton at the ejection station 43 has just fallen down and the pocket at the loading station 36 is empty and the clamp plates 51 and 52 are spread apart by the members 66. When the wheel movement stops, a sensor in the clutch 24 signals the central controller (not illustrated) and the operations at the stations are simultaneously initiated. The pneumatic unit 83 at the insertion or loading station is activated and the pusher 82 pushes the lowermost carton in the magazine 79 into the open clamp in the pocket. The pusher is held in this position while the track cylinder retracts and the clamp plates close and then the central controller actuates the pneumatic unit 83 to retract the pusher 82. Substantially simultaneously with the loading of a carton, the shoe 92 of the carton opener at the station 37 is actuated by a signal from the central controller to move past the carton and open the flaps. The shoe 92 may be returned to the initial position at the same time that the pusher 82 is retracted.

In each of the applicator stations, the central controller actuates the pneumatic unit 144 to press the heated iron 141 downwardly against the sheet and then, after a brief delay, retract. When the iron is retracted, a signal from, for example, a microswitch located to be engaged by the support 142 in its upper position signals the central controller, and the controller then actuates the pneumatic units 156 and 157 to shift the carriage to place the next set of stamps under the projections 151 on the iron 141. After every third stamping operation, the drive rollers 119 and 120 advance the sheet 116 by the distance of two adjacent rows of stamps. To minimize the shifting movement of the carriage by the units 156 and 157, the carriage need not be shifted in the next operation immediately after the sheet has been advanced by the drive rollers 119 and 120.

At the closing and gluing station 41, the pneumatic units 172 and 173 are actuated by the central controller to tilt the flaps inwardly and then to actuate the glue pump to place adhesive on the short carton flap. The station 41, as well as the other stations, have switches which signal the central controller that an operation has been completed and the mechanism is ready for the next operation. All cylinders are conventional and include "Hall Effect" solid state switches. The rotating drum, however, may include a "home position" sensor having an optical (non-contact) device. When all operations are completed, the wheel is advanced by the central controller and the next cycle is started.

Figure 14:
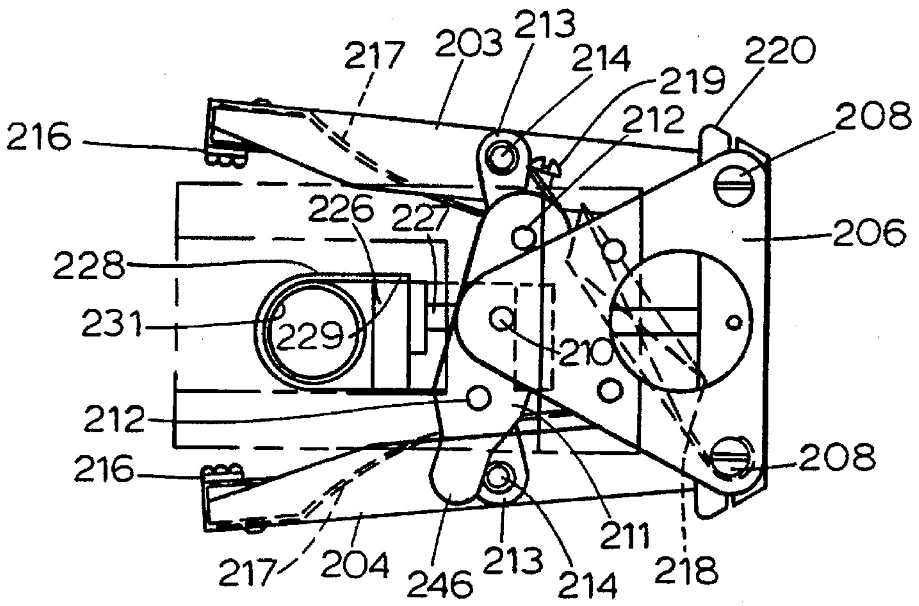
FIG. 14 is a side view of a carton receiving pocket or receptacle of the embodiment illustrated in FIG. 13.
Figure 13:
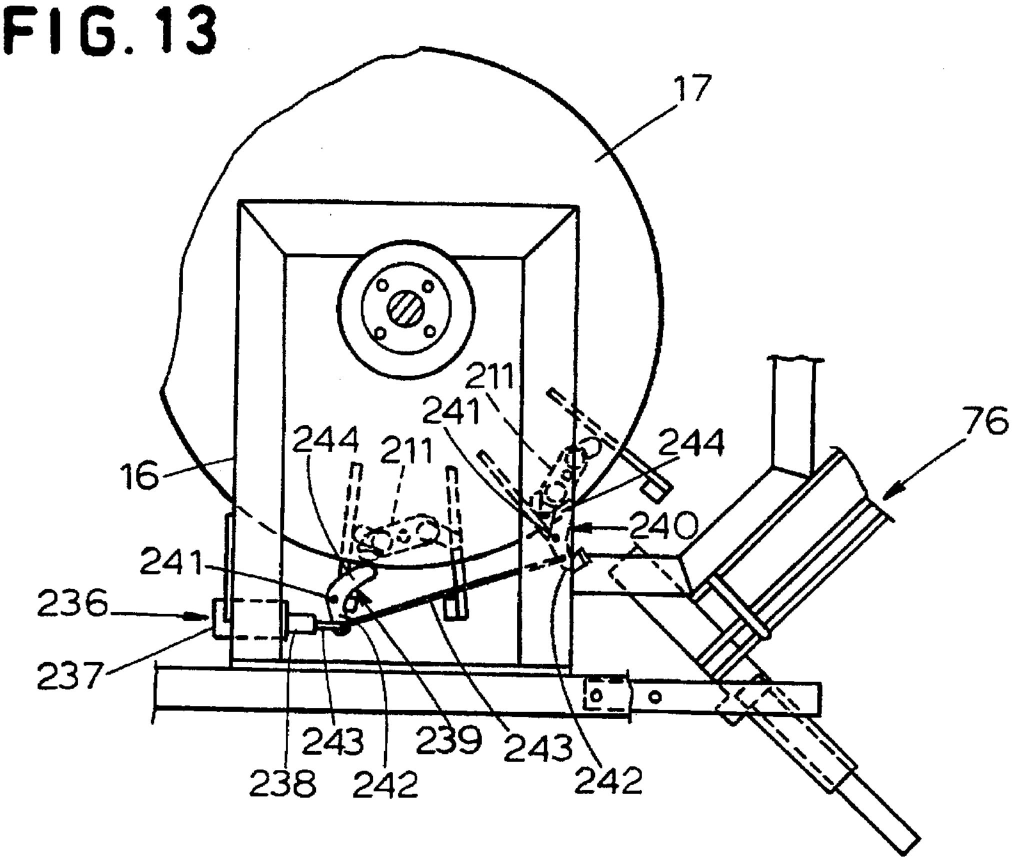
FIG. 13 is a view similar to FIG. 9 but illustrates an alternative and preferred embodiment of the invention.
Figure 15:
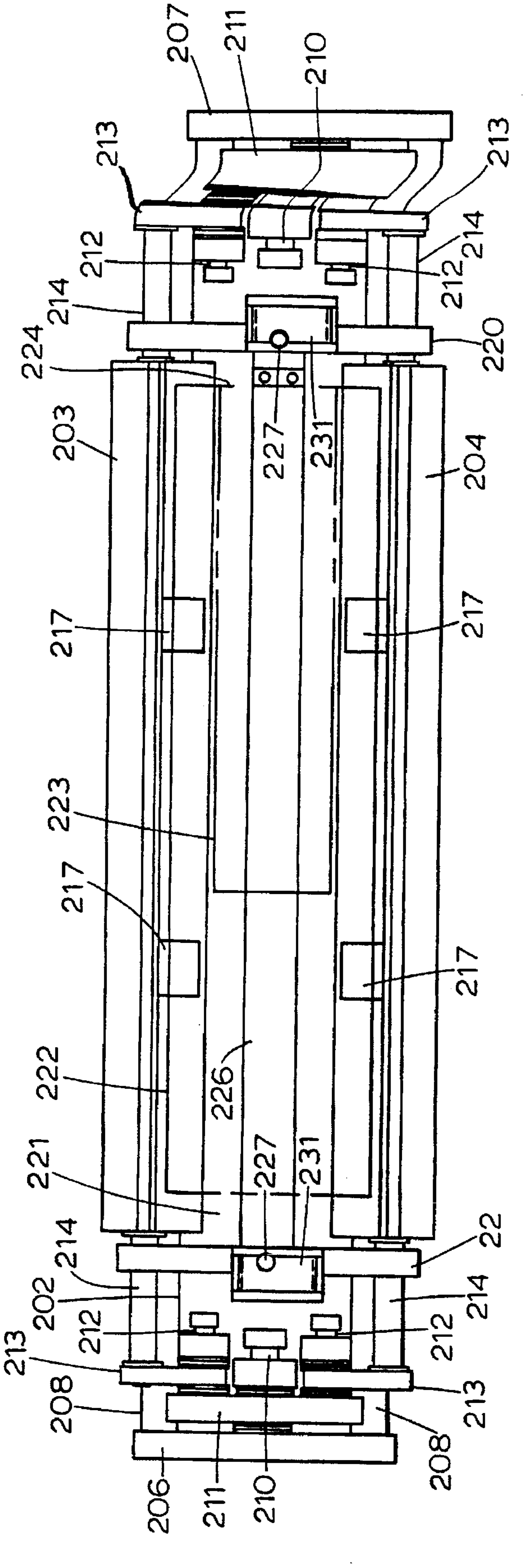
FIG. 15 is a front view of the pocket or receptacle shown in FIG. 14.

FIGS. 14 and 15 illustrate an alternative and preferred clamping mechanism 201 of the carton receiving receptacle or pocket, and FIG. 13 illustrates an alternative and preferred actuating mechanism for the clamping mechanism 201.

With reference first to FIG. 15, for each pocket, a support bar 202 extends across the space between the two discs 19 and 20 (shown in FIG. 9) and supports upper and lower clamp plates 203 and 204 (FIGS. 14 and 15). Two clamp side plates 206 and 207 are fastened to the ends of the bar 202, and upper and lower rods 208 are fastened to the side plates 206 and 207, the rods 208 being connected to pivotably support the radially inner ends of the two clamp plates 203 and 204. At the outer (the radially outer) end of each of the two side plates 206 and 207, a pivot pin 210 pivotably supports a main link 211, the links 211 being elongated and supported for pivotal movement at approximately its center as shown in FIG. 14. Near each end of each of the main links 211, pivot pins 212 connect the links 211 with secondary links 213 which are also connected by pins 214 with the center portions of the clamp plates 203 and 204. It will be recognized that the foregoing pivot link arrangement for swinging the outer ends of the clamp plates toward and away from each other, is similar to that of the previously described embodiment of the invention.

Gripper shoes 216 (FIG. 14) are fastened to the outer ends of the clamp plates to assist in holding a carton, and leaf springs 217 are fastened to the plates for centering a carton between them. A tension spring 218 (FIG. 14) is tensioned between one of the rods 208 and a screw 219 on one or both of the main links 211; from FIG. 14 it will be apparent that the spring(s) 218 tend to swing the links 211 clockwise and pull the outer ends of the clamp plates toward each other.

With reference to FIG. 15, the clamp plates 203 and 204 are elongated and form a carton receiving opening 221 between them. The lines 222 indicate the location of a large size cigarette carton, and the lines 223 indicate the location of a smaller size carton. As previously described, the springs 217 and the scissors-action of the clamp plates cause the cartons to be centered between the clamp plates regardless of the carton size. Further, the carton loading mechanism including the magazine 79 is located and preferably operated to insert cartons at the right-hand side (as seen in FIG. 15) of the opening 221. In other words, the right-hand side of the cartons, regardless of the carton size, is located at the line 224 in FIG. 15.

Each pocket further includes a back stop bar 226 (FIGS. 14 and 15) which extends across the length of the opening 221 and which is equally spaced between the two clamp plates 203 and 204. The bar 226 is slidably supported at its ends by two posts 227 which extend radially of the discs (in the inner-outer direction of the pocket). The posts 227 are outside of the opening 221 and do not interfere with a carton, and the posts are supported at their radially inner ends by brackets 220 fastened to the support bar 202. At its radially outer end, each post 227 supports a spring 228 (FIG. 14) which urges the bar 226 in the radially outer direction. The springs 228 are preferably constant force coiled strip types. The radially inner end 229 of each spring strip is attached to an end of the bar 226, and the remainder of each spring strip is wound on a tube 231 which is supported by a post 227. The mounting of the bar 226 is such that it is located to be engaged by both the small size carton 223 and the large size carton 222. As will be described later, the force of the springs 228 resists the movement of a carton into the pocket and dampens overtravel during loading, and the springs provide a positive release of the cartons out of the pocket during ejection. Further, the springs 228, since they are constant pressure types, allow for a wide variation in the carton height without damaging the cartons.

The mechanism 236 for operating the clamp mechanism 201 is best illustrated in FIG. 13. On each side of the wheels 17, an actuator 237, such as an air cylinder, is mounted on a support 16. The actuator 237 includes a plunger or piston rod 238 which is movable in the right-left direction as seen in FIG. 13. Two angle-shaped links or levers 239 and 240 are pivotably mounted on the frame adjacent the ejection station 43 and the insertion station 36, respectively. Each lever 239 and 240 is supported by a pivot pin 241 at substantially its center, and each lever has a lower arm 242 which extends generally downwardly and is connected by links 243 to the rod 238 of the actuator. Each lever also includes an upper arm 244 which extends generally upwardly and is located to engage a main link 211 of a clamp mechanism at the ejection and insertion stations. Each main link 211 includes an extension 246 (FIG. 14) which is engageable by an upper arm 244. With reference to FIG. 13, when the actuator 237 is operated to move the plunger 238 to the left, the arms 244 are caused to swing clockwise and out of engagement with the extensions 246. When the plunger 238 is moved to the right, the arms 244 swing counterclockwise, engage the extensions 246 and move the clamp mechanisms to the open position (i.e., the clamp plates are moved apart).

To load a carton into the pocket at the insertion station 36, the actuator 237 is operated by the central controller to move the plunger 238 toward the right, thereby moving the clamp plates apart. The carton loading or insertion mechanism 76 pushes a carton into the right-hand (see FIG. 15) side of the opening 221. The carton is centered by the springs 217 in the opening as the clamp plates move toward each other. The carton engages the bar 226 and pushes it back against the force of the springs 228, and the spring force prevents the carton from overshooting (due to inertia) the desired position in the pocket opening. Due to the force of gravity and the springs 228, the carton stops movement with the bar 226 against the inner side and the pusher plate against the outer side. Since the pusher plate always stops at the same location, the outer sides of the cartons will always be at the same location.

The actuator 237 is then operated to move the plunger 238 toward the left, thereby swinging the arms 244 toward the right away from the main links 244. The clamp plates then swing toward each other, and the gripper shoes 216 clamp the sides of the carton near the outer flaps. The pressure is sufficient to bulge the flaps outwardly, making it easier for the flap opener shoe to enter behind the flaps.

Simultaneously with the foregoing, there is a carton in the pocket at the ejection station, and when the plunger 238 moves to swing the clamp plates apart, the shoes 216 release the sides of the carton and the force of the springs 228 (plus gravity) pops or pushes the carton out of the pocket. Assuming that a conveyor belt 187 is mounted below the ejection station, the rapid movement of the carton causes the carton to come to rest on the conveyor before the glued flaps are able to open. The weight of the carton on the glued flaps enables the glue to set before the carton is handled again.

Thus the clamp mechanism is opened at the ejection station, is closed during the interval between the ejection and insertion stations, is opened at the insertion station, and is closed again just before movement from the insertion station.

While not illustrated in the drawings, a set of let down guides may be provided at the ejection station to hold the carton flaps closed during the time from when a carton leaves a pocket and falls onto the conveyor 187. The let down guides may comprise a plurality of parallel metal strips which are pivotably mounted above the conveyor. Such strips would have a first end located to engage the underside of a carton as it drops to the carton, and a second end counterweighted to urge the first ends upwardly and against the carton flaps.

The clamp mechanism has a number of important advantages. It receives and centers cartons of different sizes. It firmly holds the carton in the proper position despite high pressure applied on the cigarette packages by the stamp applicator. Decal-type stamps are applied to packages by heat and pressure, and the clamp mechanism is capable of holding the carton against the applicator pressure. Since the cartons are held at one end of the pockets, the stamp applicators may consistently apply stamps at the proper positions, and, for example, a tag applicator at the position station 40 may fasten a tag on the exposed end of the carton. Such tags may contain bar codes or security markings. Further, the spring-force ejection quickly pops the carton out of the pocket at the ejection station.

It will be apparent that modifications may be made without departing from the scope of the invention. For example, the stamp applicators may be modified to run "1 by 10" cartons which include a single row of ten packages. In this arrangement, a stamp roll having ten stamps in each lateral row is installed in the machine, and all ten stamps of a row are applied to the packages of a carton. The roll is advanced by one row after each carton, and the carriage is not shuttled back and forth between three positions as described above. Further, the stamp iron 141 is removed and a stamp iron having a flat bottom side (no projections) is installed.

It was previously stated that different sizes of the customary "2 by 5" cartons may be run, and this can be done without modification to the machine. In an average size carton, the stamps mays be applied near the centers of the packages, whereas in a smaller size carton, the stamps will fall closer toward the edge of the packages at one end of the carton.

I claim:

1. Apparatus for releasably holding a carton of cigarettes, comprising clamp means having a cam follower movable between a carton holding position and a release position, a frame adjacent said clamp means and said clamp means being movable relative to said frame from an ejection station to a loading station, a cam on said frame and extending from said ejection station toward said loading station, said cam being located to engage said cam follower and move said clamp means to said release position, and a movable member at said loading station and closely adjacent said cam, said cam follower moving from said cam and onto said movable member at said loading station, and said movable member effecting movement of said cam follower at said loading station to permit the movement of said clamp means to said carton holding position.

2. Apparatus for placing indicia on packages in cartons, said apparatus comprising:

a) a wheel having an outer periphery;

b) a plurality of operating stations mounted around said outer periphery;

c) a plurality of package receiving pockets mounted on said wheel adjacent said outer periphery;

d) drive means for rotating said wheel and for stopping said wheel with said pockets adjacent said stations; and e) each of said pockets comprising a carton clamp having open and closed positions, said clamp holding a carton when in said closed position and releasing the carton when in said open position, means for biasing said clamp to said closed position, actuator means for moving said clamp to said open position, and spring means for pushing a carton out of said pocket when said clamp means is moved to said open position.

3. Apparatus as set forth in claim 2, wherein said spring means comprises at lcast one constant force spring.

4. Apparatus as set forth in claim 2, wherein said spring means comprises a bar, means for movably mounting said bar in said pocket, and at least one spring connected to said bar for biasing said bar against a carton in said pocket.

5. Apparatus as set forth in claim 4, wherein said spring comprises a constant force spring.

6. Apparatus for placing indicia on packages in cartons, said apparatus comprising:

a) a wheel having an outer periphery;

b) a plurality of operating stations including an insertion station and an ejection station mounted around said outer periphery;

c) a plurality of package receiving pockets mounted on said wheel adjacent said outer periphery;

d) drive means for rotating said wheel and for stopping said wheel with said pockets adjacent said stations; and e) said pockets comprising a carton clamp having open and closed positions, said clamp holding a carton when in said closed position and releasing the carton when in said open position, and actuator means at said insertion station and at said ejection station for permitting said clamps to move to the closed position at the insertion station and for moving said clamps to the open position at the ejection station, said actuator means comprising a pivotable lever at each of said insertion and ejection stations, an actuating device including a movable plunger, and link means connecting said plunger with said levers, said levers being pivotable to engage and move said clamps to said open position.

* * * * *